(12) United States Patent
Chou et al.

(10) Patent No.: US 8,587,434 B2
(45) Date of Patent: Nov. 19, 2013

(54) NEAR-FIELD COMMUNICATION APPARATUS AND ASSOCIATED METHOD

(75) Inventors: Feng-Jian Chou, Hsinchu Hsien (TW); Shih-Yen Huang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 402 days.

(21) Appl. No.: 12/953,564

(22) Filed: Nov. 24, 2010

(65) Prior Publication Data
US 2011/0156906 A1 Jun. 30, 2011

(30) Foreign Application Priority Data

Dec. 31, 2009 (TW) .............................. 98146590 A

(51) Int. Cl.
*G08B 13/14* (2006.01)
(52) U.S. Cl.
USPC ....................................................... 340/572.1
(58) Field of Classification Search
USPC .................. 340/572.1–572.9, 10.1; 455/41.1
See application file for complete search history.

(56) References Cited

U.S. PATENT DOCUMENTS

| | | | | |
|---|---|---|---|---|
| 8,258,952 B2* | 9/2012 | Hyde et al. | ................. | 340/572.1 |
| 8,284,058 B2* | 10/2012 | Hyde et al. | ................. | 340/572.1 |
| 2007/0185749 A1* | 8/2007 | Anderson et al. | ................. | 705/7 |

* cited by examiner

*Primary Examiner* — Phung Nguyen
(74) *Attorney, Agent, or Firm* — Edell, Shapiro & Finnan, LLC

(57) ABSTRACT

A near-field communication apparatus comprises an antenna, a signal processing circuit, a storage unit and a signal transmission interface. The antenna receives and transmits a wireless signal transmitted from and to a reader. The signal processing circuit, comprising a first port, a second port and a third port, generate a mapping data, wherein the first port is coupled to the antenna. The storage unit, coupled to the second port, comprises a predetermined memory area for storing the mapping data by the signal processing circuit. And the signal transmission interface, coupled or directly connected to the third port, for receiving an external signal and mapping the external signal to the mapping data by the signal processing circuit.

12 Claims, 6 Drawing Sheets

NEAR-FIELD COMMUNICATION APPARATUS AND ASSOCIATED METHOD

CROSS REFERENCE TO RELATED PATENT APPLICATION

This patent application is based on Taiwan, R.O.C. patent application No. 98146590 filed on Dec. 31, 2009.

FIELD OF THE INVENTION

The present invention relates to a near-field communication apparatus and an associated method, and more particularly, to a radio frequency identification (RFID) tag and an associated method for directly accessing a storage unit.

BACKGROUND OF THE INVENTION

RFID is a near-field RF identification and data exchange technique. An RFID system commonly comprises an RFID tag and an RFID reader. The RFID tag communicates with the RFID reader by generating an RF signal via a built-in antenna to transmit information stored in the RFID tag to the RFID reader, and the RF signal corresponds to a predetermined frequency. Generally, the RFID tag serves as a price tag or an indication tag, but is not used together with other external circuits. That is, the RFID tag neither transmits a received data to external circuits, nor transmits a data received from external circuits to the RFID reader via an RF approach. In addition, in some special applications, the RFID tag communicates with other circuits by an additional micro-control unit (MCU). However, usage of the additional MCU may substantially increase complexity and cost of the RFID tag and external circuits, and additional power supply needs to be provided to the MCU. Therefore, a solution for reducing complexity of data writing or reading between the RFID tag and other circuits as well as effectively reducing product cost of the overall RFID system is desired.

SUMMARY OF THE INVENTION

Therefore, one object of the present invention is to provide an RFID tag and an associated method for directly access a storage unit, so as to solve the problem faced by the conventional RFID tag.

According to an embodiment of the present invention, a near-field communication apparatus comprises an antenna, a signal processing circuit, a storage unit and a signal transmission interface. The antenna receives and transmits a wireless signal transmitted from and to a reader. The signal processing circuit, comprising a first port, a second port and a third port, generates mapping data, wherein the first port is coupled to the antenna. The storage unit, coupled to the second port, comprises a predetermined memory area for storing the mapping data generated by the signal processing circuit. The signal transmission interface, coupled to the third port, receives an external signal and mapping the external signal to the mapping data generated by the signal processing circuit.

According to another embodiment of the present invention, a near-field communication method applied to an RFID tag comprising a storage unit and a signal transmission interface. The near-field communication method comprises receiving an external signal from the signal transmission interface; mapping the external signal to mapping data; storing the mapping data in a predetermined memory area of a storage unit; and generating an RF transmission signal according to the mapping data.

DETAILED DESCRIPTION OF THE PREFERRED EMBODIMENT

Figure 1:
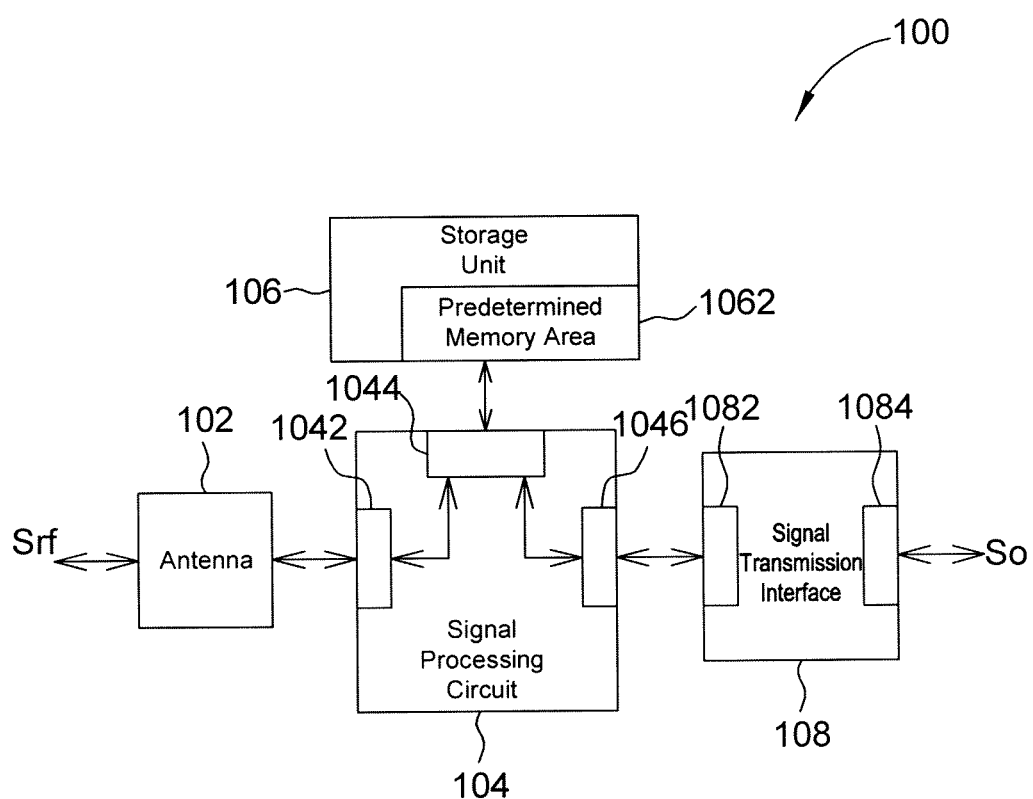
FIG. 1 is a schematic diagram of a near-field communication apparatus in accordance with an embodiment of the present invention.

FIG. 1 shows a schematic diagram of a near-field communication apparatus in accordance with an embodiment of the present invention. In this embodiment, the near-field communication apparatus is an RFID tag of an RFID system. Therefore, in following paragraphs, the near-field communication apparatus is described as an RFID tag 100, which comprises an antenna 102, a signal processing circuit 104, a storage unit 106, and a signal transmission interface 108. The antenna 102 receives an RF signal Srf from an RFID reader (not shown), or transmits the external signal Srf to the RFID reader. The signal processing circuit 104 comprises a first port 1042 coupled to the antenna 102, a second port 1044, and a third port 1046. The storage unit 106 coupled to the second port 1044 stores data from the signal processing circuit 104. The signal transmission interface 108 coupled to the third port 1046 provides a communication interface to transmit an external signal So to the signal processing circuit 104. In this embodiment, a first interface 1082 of the signal transmission interface 108 is coupled or directly connected to the third port 1046 of the signal processing circuit 104, and a second interface 1084 of the signal transmission interface is coupled to an external device (not shown). The external signal So may be generated by the external device to the signal processing circuit 104, or may be generated by the signal processing circuit 104 to an external device. In addition, the signal transmission interface 108 provided by the present invention is used to map the external signal So to a predetermined memory area 1062 of the storage unit 106. More specifically, the signal processing circuit 104 stores mapping data into the predetermined memory area 1062 according to the external signal So received from the signal transmission interface 108, or transmits information stored in the predetermined memory area 1062 to the external device via the signal transmission interface 108. Therefore, with respect to the foregoing two situations, characteristics are respectively illustrated according to FIG. 2 and FIG. 3.

Figure 2:
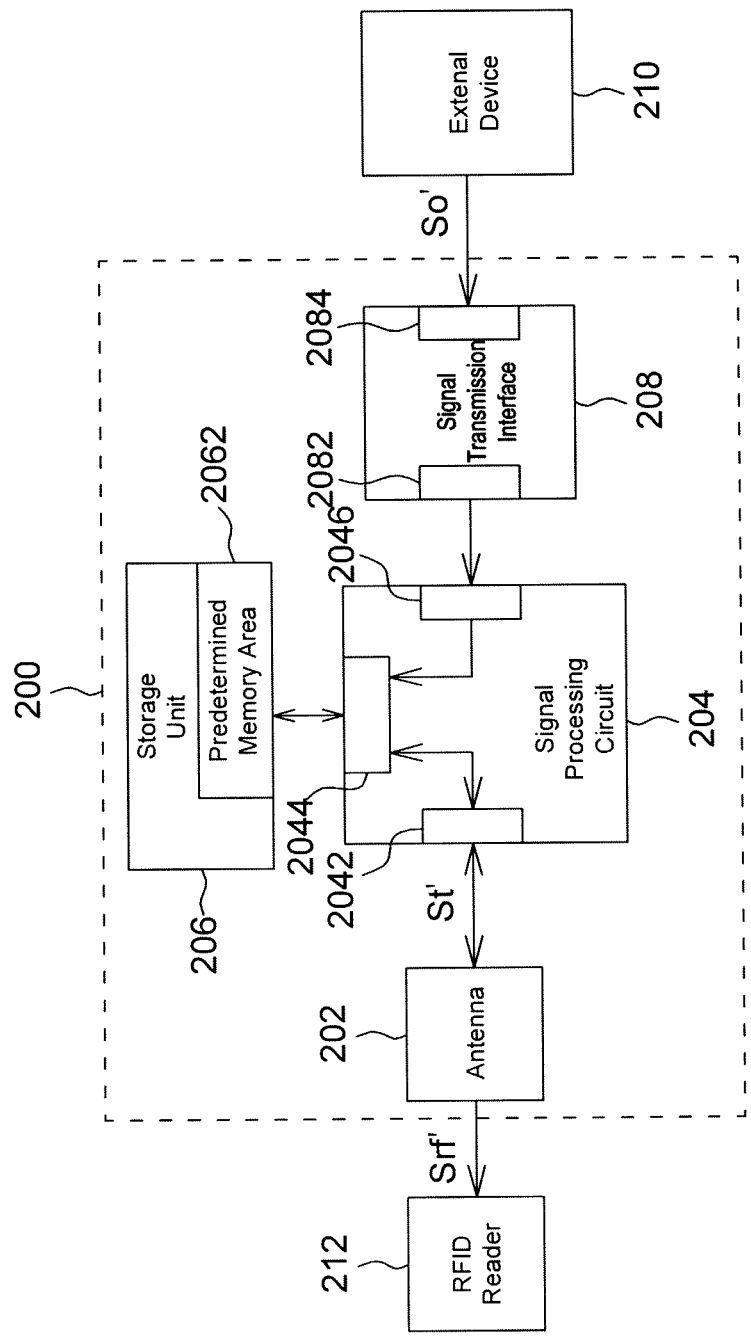
FIG. 2 is a schematic diagram of an RFID tag in accordance with a first embodiment of the present invention.

FIG. 2 shows a schematic diagram of an RFID tag 200 in accordance with a first embodiment of the present invention. The RFID tag 200 comprises an antenna 202, a signal processing circuit 204, a storage unit 206, and a signal transmission interface 208. The signal processing circuit 204 comprises a first port 2042, a second port 2044, and a third port 2046. The signal transmission interface 208 maps an external signal So' generated by an external device 210 to a predetermined memory area 2062 of the storage unit 206. It is to be noted that, in this embodiment, the implementation of the RFID 200 are similar to those of the RFID tag 100 in FIG. 1, and details thereof shall not be described for brevity. In addition, the external device 210 is coupled to a second interface 2084 of the signal transmission interface 208. When the external device 210 generates an external signal So', the signal processing circuit 204 receives the external signal So' via the signal transmission interface 208, and stores mapping data into the predetermined memory area 2062 according to the external signal So' to update data stored in the predetermined memory area 2062. According to the updated data, i.e., the mapping data, the signal processing circuit 204 generates a transmission signal St' to the antenna 202 in order to transmit the mapping data to an RFID reader 212 via the RF approach (i.e., via an RF signal Srf'). Accordingly, the external device 210 updates the mapping data stored in the storage unit 206 via the signal transmission interface 208 provided by the present invention, and the signal processing circuit 204 and the antenna 202 also transmit the mapping data to the RFID reader 212 in real-time (or after a period), such that a user of the RFID 200 knows the mapping data stored in the storage unit 206 in time.

Figure 3:
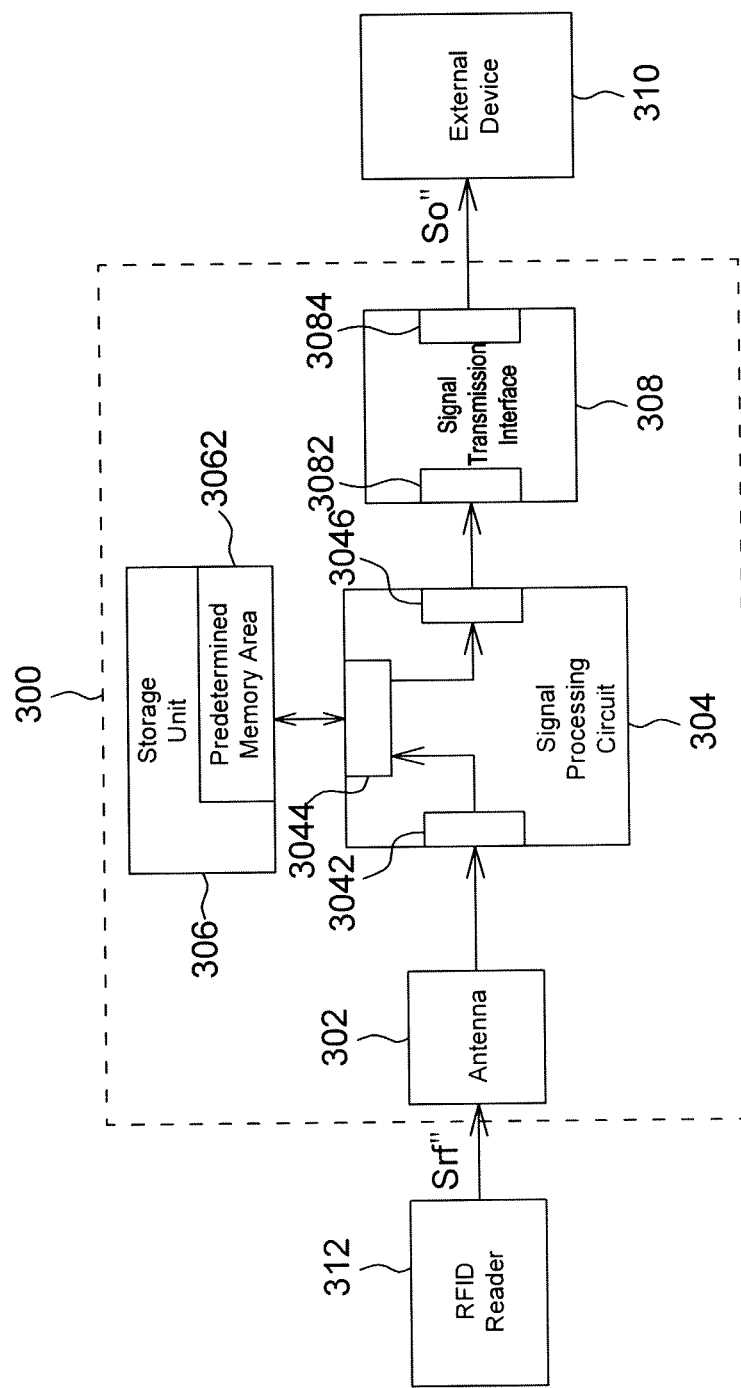
FIG. 3 is a schematic diagram of an RFID tag in accordance with a second embodiment of the present invention.

FIG. 3 shows a schematic diagram of an RFID tag 300 in accordance with a second embodiment of the present invention. The RFID tag 300 comprises an antenna 302, a signal processing circuit 304, a storage unit 306, and a signal transmission interface 308. The signal processing circuit 304 comprise a first port 3042, a second port 3044, and a third port 3046. The signal transmission interface 308 maps a predetermined memory area 3062 of the storage unit 306 to an external signal So" sent to an external device 310. Likewise, in this embodiment, the implementation of the RFID tag 300 is similar to that of the RFID tag 100 in FIG. 1, and details thereof shall not described for brevity. In addition, an external device 310 is coupled to a second interface 3084 of the signal transmission interface 308. When the antenna 302 receives an RF signal Srf" transmitted from an RFID reader 212, the signal processing circuit 304 decodes the RF signal Srf" to generate mapping data, and stores the mapping data into the predetermined memory area 3062 of the storage unit 306. The signal processing circuit 304 outputs the mapping data stored in the predetermined memory area 3062 to the external device 310 via the signal transmission interface 308. In other words, the signal processing circuit 304 generates an external signal So" to the external device 310 according to the mapping data stored in the predetermined memory area 3062, such that the external device 310 can receive the mapping data stored in the predetermined memory area 3062 in time. It is to be noted that, a sequence for updating the predetermined memory area 3062 and generating the external signal So" by the signal processing circuit 304 according to the present invention is not limited. More specifically, in an embodiment, the signal processing circuit 304 first updates the predetermined memory area 3062 according to the mapping data, and then generates the external signal So" to the external device 310 according to the mapping data. In another embodiment, the signal processing circuit 304 first generates the external signal So" to the external device 310 according to the mapping data, and then updates the predetermined memory area 3062 according to the mapping data. In yet another embodiment, the signal processing circuit 304 simultaneously generates the external signal So" to the external device 310 and updates the predetermined memory area 3062 according to the mapping data. Accordingly, the external device 310 receives the mapping data stored in the storage unit 306 via the signal transmission interface 308, such that the user of the external device 310 can know the mapping date stored in the storage unit 306 of the RFID tag 300 in time.

Figure 4:
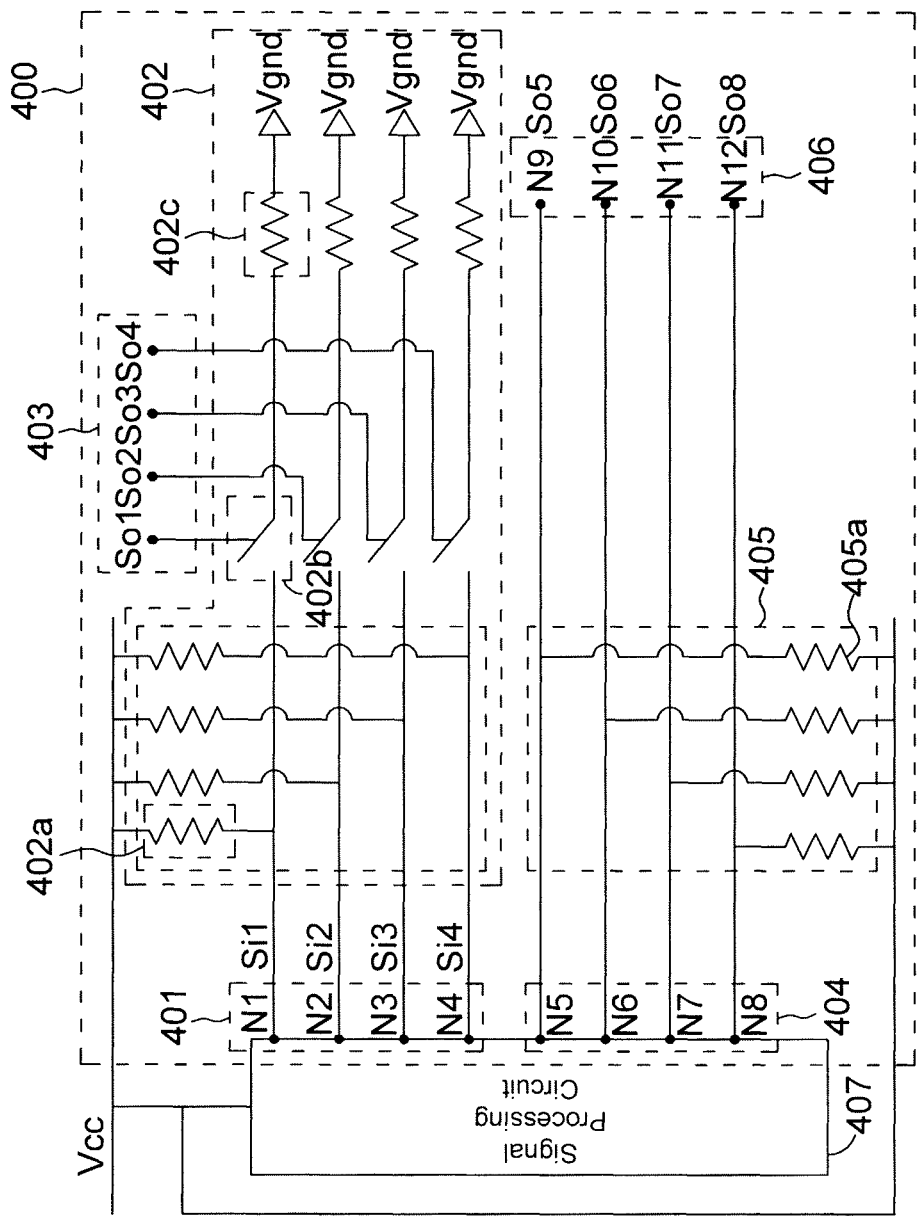
FIG. 4 is a schematic diagram of a signal transmission interface in accordance with an embodiment of the present invention.

It is to be noted that, although FIG. 2 and FIG. 3 are taken as an example to illustrate the foregoing operating situations, it does not mean that the two different operation situations are independent to each other, i.e., a person having ordinary skills in the art may integrate the foregoing technique characteristics in a same RFID tag after having read and having appropriately modified the foregoing technique solutions—such modifications are also within the scope of the present invention. FIG. 4 shows a schematic diagram of a signal transmission interface 400 in accordance with an embodiment of the present invention. The signal transmission interface 400 integrates technique characteristics of the signal transmission interfaces 208 and 308 as respectively shown in FIG. 2 and FIG. 3. Therefore, the signal transmission interface 400 comprises a first input signal interface 401, a plurality of voltage dividing circuits 402, a second input signal interface 403, a third input signal interface 404, a plurality of load circuits 405, and a fourth input signal interface 406. The first input signal interface 401, the plurality of voltage dividing circuit 402 and the second input signal interface 403 form the signal transmission interface 208, and the third signal interface 404, the plurality of load circuits 405 and the fourth input signal interface 406 form the signal transmission interface 308. The first input signal interface 401, comprising a plurality of end points N1 to N4 coupled to a signal processing circuit 407, respectively generates a plurality of input signals Si1 to Si4 at the plurality of end points N1 to N4 according to a plurality of input control signals So1 to So4, and a voltage level of each input signal of the plurality of input signal Si1 to Si4 is controlled by one of the plurality of input control signals So1 to So4 and is selectively defined as a first voltage level or a second voltage level. It is to be noted that, the plurality of input control signals So1 to So4 are equivalent to the external signal So'.

In this embodiment, one of voltage dividing circuits 402 comprises a first resistor 402a, a switch circuit 402b, and a second resistor 402c. The resistor 402a (e.g., having a resistance value of 10K) has a first end point coupled to a first voltage Vcc (e.g., a supply voltage), and a second end point (e.g., the end point N1) coupled to the signal processing circuit 407. The second resistor 402c (e.g., having a resistance value of 1K) has a first end point coupled to a second end of the switch circuit 402b, and a second end point coupled to a second voltage Vgnd (e.g., a ground voltage). The switch circuit 402b is used for receiving an input control signal (e.g., So1) of the plurality of input control signals So1 to So4 and selectively connecting or disconnecting the first resistor 402a and the second resistor 402c according to the input control signal. FIG. 4 shows a schematic diagram of circuit connections of the signal transmission interface 400. When the first end point of a second resistor is connected to the second end point of a resistor according to an input control signal, a corresponding input signal (e.g., the input signal Si1 corresponding the input control signal So1) has a low voltage level due to voltage-dividing resistors. In contrast, when the connection is opened between the first end point of the second resistor and the second end point of the first resistor according to the input control signal, the corresponding input signal has a high voltage level. Therefore, the signal processing circuit 407 decodes the input signals Si1 to Si4 at the plurality of end points N1 to N4, so as to generate mapping data for updating the data stored in the predetermined memory area 2062.

The third input signal interface 404 has a plurality of end points N5 to N8 coupled to the signal processing circuit 407, and the fourth input signal interface 406 has a plurality of output end points N9 to N12 for respectively outputting a plurality of output signals So5 to So8. It is to be noted that, the plurality of output signals So5 to So8 are equivalent to the external signal So". Each of the load circuits 405 comprises a resistor (e.g., 405a), which has a first end point coupled to the first voltage Vcc, and a second end point that is coupled to the signal processing circuit 407 and outputs an output signal (e.g., So5). As seen from the circuit connections in FIG. 4, the signal processing circuit 407 respectively controls voltage levels at a plurality of end points N5 to N8 according to the mapping data stored in the predetermined memory area 3062 of the storage unit 306, and the plurality of output end points N9 to N12 are for outputting corresponding output signals So5 to So8 to the external device 310.

Figure 5:
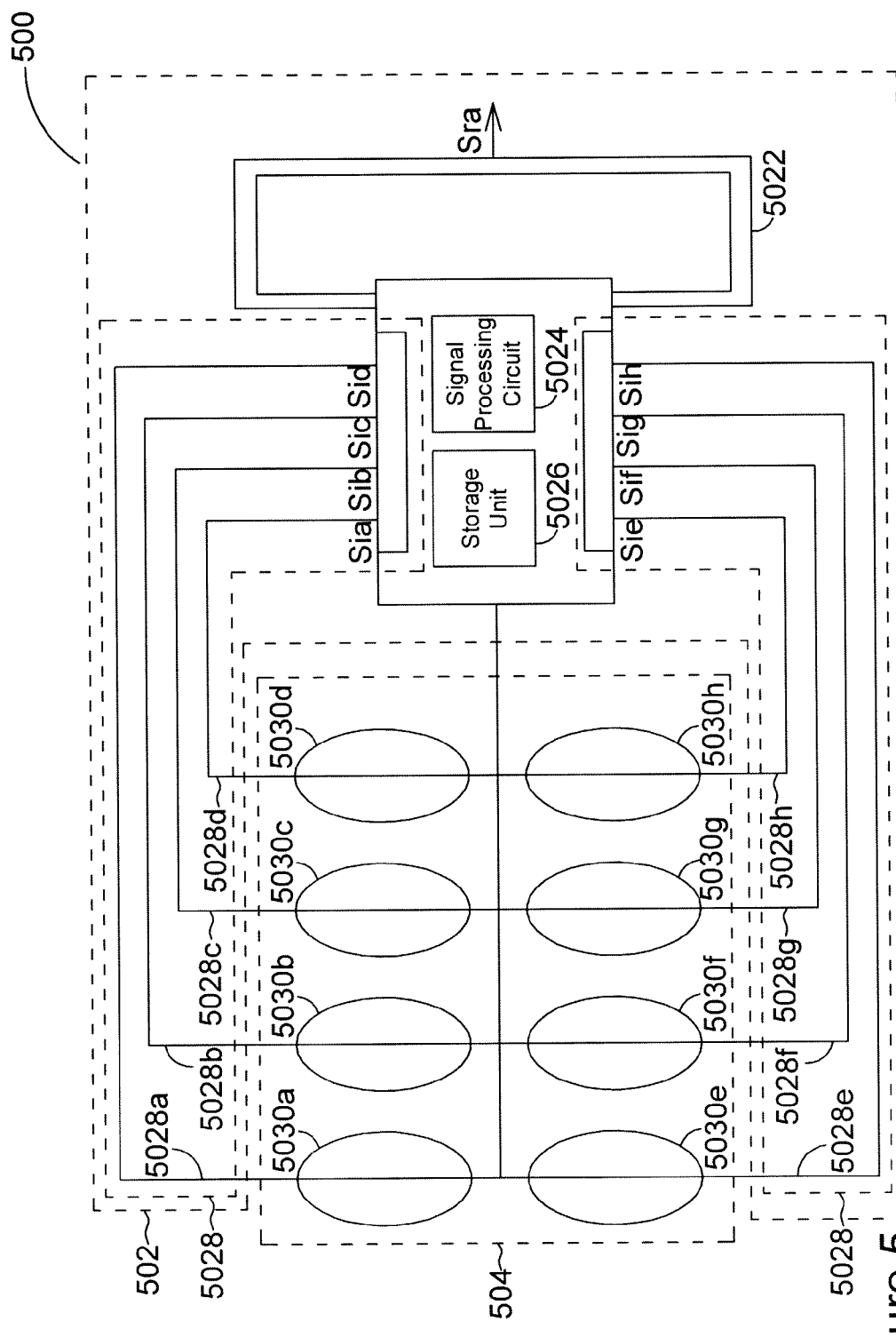
FIG. 5 is a schematic diagram of a medicine box in accordance with an embodiment of the present invention.

FIG. 5 shows a schematic diagram of a medicine box 500 in accordance with an embodiment of the present invention. The medicine box 500 is an application of the RFID tag 200 provided by the present invention. The medicine box 500 comprises an RFID tag 502 and a plurality of conductive medicine packets 504. The RFID tag 502 comprises an antenna 5022, a signal processing circuit 5024, a storage unit 5026, and a signal transmission interface 5028. It is to be noted that, the antenna 5022, the signal processing circuit 5024, the storage unit 5026 and the signal transmission interface 5028 in this embodiment are similar to the antenna 202, the signal processing circuit 204, the storage unit 206 and the signal transmission interface 208, and technique characteristics and connections thereof shall not be described for brevity. In addition, the signal transmission interface 5028 in this embodiment is an input signal interface comprising a plurality of signal transmission paths 5028a to 5028h for respectively defining a plurality of input control signals Sia to Sih, and the plurality of signal transmission paths 5028a to 5028h are respectively coupled to a plurality of conductive medicine packets 5030a to 5030h. Logical values of the input control signals Sia to Sih are determined according to conductive statuses of the plurality of conductive medicine packets 5030a to 5030h. When a user pricks one of the medicine packet (e.g., 5030a) to take out a pill from the medicine packet, a corresponding signal transmission path (e.g., 5028a) is open, and an corresponding input control signal (e.g., Sia) accordingly has a high voltage level with reference to the technique characteristics disclosed by a plurality of voltage dividing circuits 402 in FIG. 4. Accordingly, the RFID tag 502 accesses voltage levels of the input control signals Sia to Sih via the signal transmission interface 5028 to determine whether the pill in the medicine packet is taken out, thereby tracing medicine-taking behavior of the user. Similar to the RFID tag 200, the RFID tag 502 stores predetermined data decoded by the input control signals Sia to Sih into the storage unit 5026, and transmits an RF signal Sra to a RFID reader via the antenna 5022. Accordingly, the medicine-taking behavior of the user is recorded and is automatically transmitted to an associated unit without wasting more human resources to trace the medicine-taking behavior.

Figure 6:
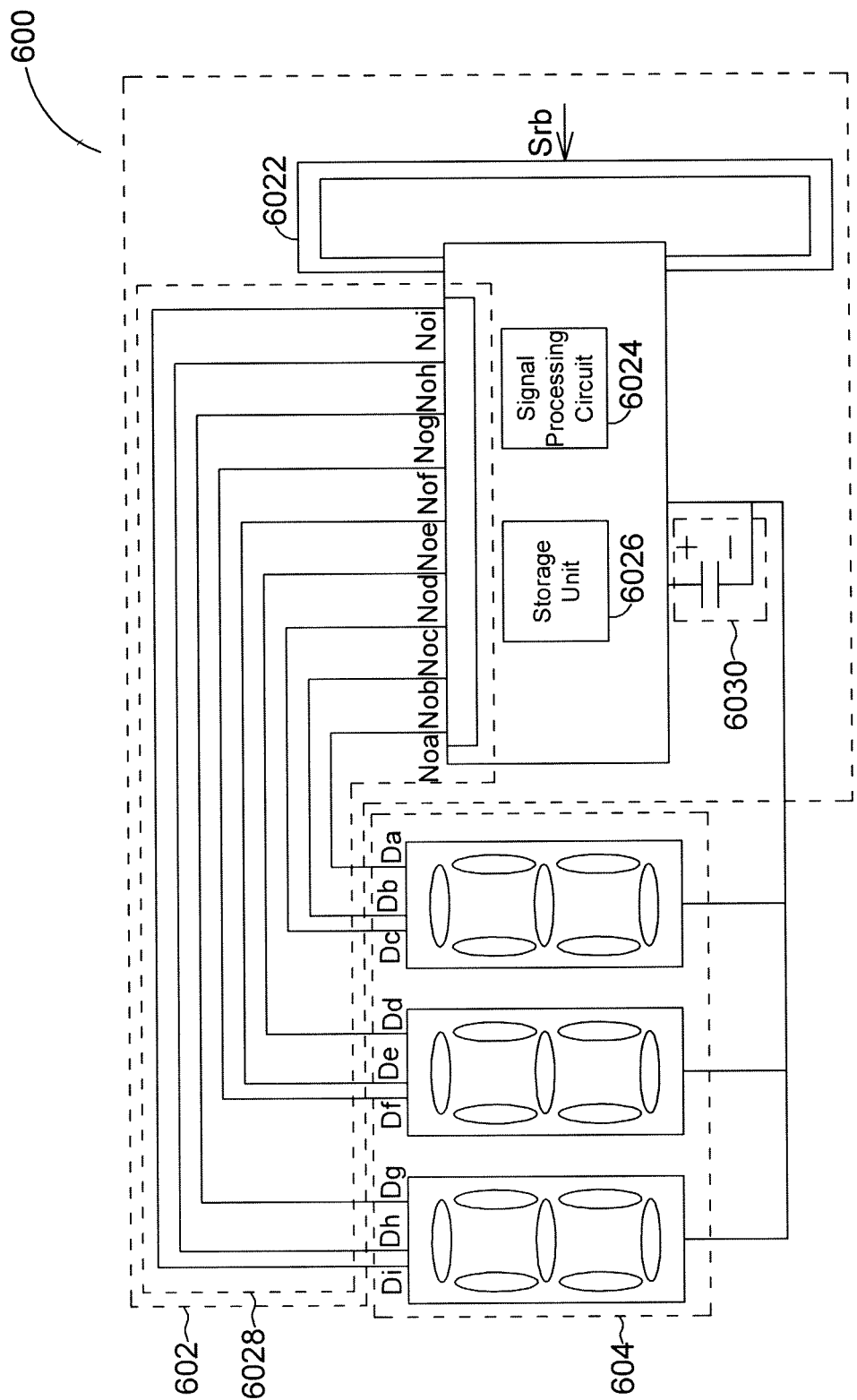
FIG. 6 is a schematic diagram of a price displayer in accordance with an embodiment of the present invention.

FIG. 6 shows a price displayer 600 in accordance with an embodiment of the present invention, and the price displayer 600 is an application of the RFID tag 300 according to the present invention. The price displayer 600 comprises an RFID tag 602 and a displaying unit 604. The RFID tag 602 comprises an antenna 6022, a signal processing circuit 6024, a storage unit 6026, a signal transmission interface 6028, and a power supply 6030. It is to be noted that, the antenna 6022, the signal processing circuit 6024, the storage unit 6026 and the signal transmission interface 6028 are similar to the antenna 302, the signal processing circuit 304, the storage unit 306 and the signal transmission interface 308 of the RFID tag 300, and technique characteristics and connections thereof shall not be described for brevity. The power supplier 6030 provides a power supply to the displaying unit 604. In addition, the signal transmission interface 5028 is an output signal interface comprising a plurality of output ends Noa to Noi, which are respectively for outputting a plurality of output signals Da to Di. Therefore, the output signals Da to Di are used for controlling digits (or prices) displayed on the displaying unit 604. Similar to the RFID tag 300, when the antenna 6022 of the price displayer 600 receives an RF signal Srb from a RFID reader to modify a price displayed on the displaying unit 604, the signal processing circuit 6024 stores a desired price into the storage unit 6026, and generates the output signals Da to Di corresponding to the desired price at the output ends Noa to Noi. The displaying unit 604 displays the updated price according to the output signals Da to Di. Accordingly, when the price displayer 600 is extremely frequently applied, a price displayed on each price displayer may be directly modified by a transmitter via an RF approach to reduce a large amount of human resources and time.

In conclusion, the foregoing method may be characterized as: receiving an external signal from a signal transmission interface of an RFID tag; directly mapping the external signals to a predetermined memory area of a storage unit of the RFID tag via the signal transmission interface; and generating an RF signal according to mapping data stored in the predetermined memory area. Since the RFID tag according to the present invention comprises the signal transmission interface for directly mapping the external signals to the predetermined memory area of the storage unit of the RFID tag, data is directly written into the predetermined memory area via the signal transmission interface, or the mapping data stored in the predetermined memory area is directly read via the signal transmission interface, thereby reducing complexity of writing data into or reading data from the RFID tag without implementing the conventional data access approach. Further, since the signal transmission interface need not be operated within an RF frequency range, the RFID tag also has extremely low product cost.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A near-field communication apparatus, comprising:
an antenna, for transceiving a wireless signal;
a signal processing circuit, comprising a first port, a second port and a third port for generating mapping data, wherein the first port is coupled to the antenna;
a storage unit, coupled to the second port, comprising a predetermined memory area for storing the mapping data by the signal processing circuit; and
a signal transmission interface, coupled to the third port, for receiving an external signal and mapping the external signal to the mapping data by the signal processing circuit,
wherein the external signal comprises an input control signal, and the signal transmission interface comprises an input signal interface, coupled or directly connected to the signal processing circuit, for receiving an input signal according to the input control signal, wherein the input signal is controlled by the input control signal and is selectively defined as one of a first voltage level and a second voltage level.

2. The near-field communication apparatus as claimed in claim 1, wherein the signal processing circuit generates the mapping data corresponding to the external signal and stores the mapping data in the predetermined memory area.

3. The near-field communication apparatus as claimed in claim 2, wherein the signal processing circuit further generates a transmission signal to the antenna according to the mapping data stored in the predetermined memory area.

4. The near-field communication apparatus as claimed in claim 1, wherein the signal processing circuit transmits an output signal corresponding to the mapping data stored in the predetermined memory area to the signal transmission interface.

5. The near-field communication apparatus as claimed in claim 4, wherein the signal processing circuit further generates the mapping data according to the wireless signal received from the antenna and stores the mapping data in the predetermined memory area.

6. The near-field communication apparatus as claimed in claim 1, wherein the input signal interface comprises:
 a first resistor, comprising a first end point coupled to a first voltage, and a second end point;
 a second resistor, comprising a first end point and a second end point coupled to a second voltage; and
 a switch circuit, for receiving the input control signal and connecting the second end point of the first resistor and the first end point of the second resistor according to the input control signal.

7. The near-field communication apparatus as claimed in claim 1, wherein the input signal interface comprises:
 a signal transmission path, for determining the input control signal, wherein the input control signal is the first level voltage when the signal transmission path is an open circuit, and the input control signal is the second level voltage when the signal transmission path is a closed circuit.

8. A near-field communication apparatus, comprising:
 an antenna, for transceiving a wireless signal;
 a signal processing circuit, comprising a first port, a second port and a third port for generating mapping data, wherein the first port is coupled to the antenna;
 a storage unit, coupled to the second port, comprising a predetermined memory area for storing the mapping data by the signal processing circuit; and
 a signal transmission interface, coupled to the third port, for receiving an external signal and mapping the external signal to the mapping data by the signal processing circuit,
 wherein the external signal comprises at least one output signal, and the signal transmission interface comprises:
 an output signal interface, comprising at least one output end point coupled to the signal processing circuit, for outputting the at least one output signal according to the mapping data, and
 wherein the output signal interface comprises:
 at least one resistor, comprising a first end point coupled to a voltage, and a second end point coupled to the signal processing circuit for outputting the at least one output signal.

9. The near-field communication apparatus as claimed in claim 8, further comprising:
 a displaying unit, coupled to the output signal interface, for displaying a price according to the at least one output signal.

10. The near-field communication apparatus as claimed in claim 8, wherein the displaying unit displays a digit according to the at least one output signal.

11. The near-field communication apparatus as claimed in claim 10, wherein the displaying unit is a price displayer.

12. A near-field communication method, applied to a radio frequency identification (RFID) tag comprising a storage unit and a signal transmission interface, the method comprising:
 receiving an external signal from the signal transmission interface;
 mapping the external signal to mapping data;
 storing the mapping data in a predetermined memory area of a storage unit; and
 generating an RF transmission signal according to the mapping data,
 wherein the external signal is controlled by the input control signal and is selectively defined as one of a first voltage level and a second voltage level.

* * * * *